United States Patent
Ooiwa (10) Patent No.: US 7,408,280 B2
(45) Date of Patent: Aug. 5, 2008

(54) ROTOR OF ROTARY ELECTRIC MACHINE

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 50 days.

(21) Appl. No.: 11/500,459

(22) Filed: Aug. 8, 2006

(65) Prior Publication Data
US 2007/0046137 A1    Mar. 1, 2007

(30) Foreign Application Priority Data
Aug. 30, 2005    (JP)    ............... 2005-249749

(51) Int. Cl.
*H02K 1/24* (2006.01)
(52) U.S. Cl. .................. 310/156.56; 310/217; 310/263
(58) Field of Classification Search ..............
310/156.66–156.73, 156.53, 156.56, 263, 310/216, 217
See application file for complete search history.

(56) References Cited

U.S. PATENT DOCUMENTS

| | | | | |
|---|---|---|---|---|
| 5,955,807 A | * | 9/1999 | Kajiura et al. | 310/156.66 |
| 6,157,111 A | * | 12/2000 | Asao | 310/263 |
| 6,356,001 B1 | * | 3/2002 | Nishiyama et al. | 310/156.53 |
| 6,680,557 B2 | * | 1/2004 | Kusase | 310/263 |
| 6,882,081 B2 | | 4/2005 | Isoda et al. | |
| 2006/0113861 A1 | * | 6/2006 | Mukai et al. | 310/263 |

FOREIGN PATENT DOCUMENTS

| | | |
|---|---|---|
| JP | 2002-247817 | 8/2002 |
| JP | 2005-27415 | 1/2005 |

* cited by examiner

*Primary Examiner*—Tran Nguyen
(74) *Attorney, Agent, or Firm*—Oliff & Berridge, PLC (57) ABSTRACT

A Lundell type rotor core with a pair of side cores and a magnetic-pole cylindrical portion has a structure in which the magnetic-pole cylindrical portion is mated between both the side cores (also referred to as "pole cores") in a radial direction at an outside of a field coil wound on a boss portion in the side cores. The magnetic-pole cylindrical portion is made of plural magnetic steel sheets laminated in the axis direction, and is easily deformed rather than both the side cores. The easy deformation characteristic of the magnetic-pole cylindrical portion prevents generation of a gap during the assembling process of the magnetic-pole cylindrical portion and the side cores. Without paying strict dimension control of the components for the rotor core, it is easily possible to prevent any generation of a gap between the side cores and the magnetic-pole cylindrical portion while assembling. It is thereby possible to prevent a deterioration of a magnetic flux flowing in the rotor core.

18 Claims, 8 Drawing Sheets

ROTOR OF ROTARY ELECTRIC MACHINE

CROSS-REFERENCE TO RELATED APPLICATIONS

This application is related to and claims priority from Japanese Patent Application No. 2005-249749 filed on Aug. 30, 2005, the contents of which are hereby incorporated by reference.

BACKGROUND OF THE INVENTION

1. Field of the Invention

The present invention generally relates to an improved rotor of a rotary electric machine such as a vehicle alternator to be driven by an internal combustion engine of a vehicle, for example.

2. Description of the Related Art

The Lundell type rotor core of a rotor in an ordinary available vehicle alternator has a boss portion, disk portions (or pole cores), and a pair of pole cores. Through the boss portion a field magnetic flux flows in the axis direction of the rotor in the inside area of a field coil and in the radial direction of the field coil. The disk portions, that are formed extended from both the outer end of the boss portion in the axis direction toward the outer end of the boss portion in the radial direction, provides the field magnetic flux in the radial direction of the rotor. Each of a pair of the pole cores has plural claw poles extending axially from outer periphery of the disk portion in the radial direction of the rotor so that the plural claw poles accommodate the field coil wound on the outer peripheral surface of the boss portion. The field magnetic flux is transferred between the plural claw poles and the stator core.

Each claw pole in one pole core and the corresponding claw pole of the other pole core are placed alternately in the circumferential direction of both the pole cores. Such an ordinary Lundell type rotor core is manufactured by facing a pair of the pole cores to each other and then assembling them in the axis direction of the rotor. Each of the pole cores is made of soft magnetic core of an ingot shape.

Such an ordinary Lundell type rotor core involves a drawback to generate large wind noise and to cause windage loss while the rotor core rotates at a high speed rotation because the claw poles of the pole core are exposed in the radial direction of the field coil in the outer space of the field coil wound on the boss portion of the rotor.

In order to avoid such a drawback described above, prior documents, the Japanese patent laid open publications No. 2002-247817 and No. 2005-27415 have disclosed a mechanism to form a magnetic-pole cylindrical portion that covers the outside of the field coil in the radial direction (hereinafter, the rotor core having such a mechanism will be referred to as "a Lundell type rotor core having a magnetic-pole cylindrical portion", and the cylindrical portion has a hollow cylindrical shape.)

Because each of the plural claw poles in such a Lundell type rotor core is not exposed in the outer space in the radial direction of the field coil, it is possible to reduce wind noise generated at each claw pole. In more detail, the Lundell type rotor core with the magnetic-pole cylindrical portion has the boss portion, a pair of the disc portions, and the magnetic-pole cylindrical portion. Through the boss portion a field magnetic flux flows in the axis direction of the rotor in the inside area of the field coil and in the radial direction of the field coil. A pair of the disk portions, that is formed extended from both outer ends of the boss portion in the axis direction thereof toward the outer end of the boss portion in the radial direction thereof, provides the field magnetic flux in the radial direction of the rotor. The magnetic-pole cylindrical portion is placed or mated between a pair of the disk portions in the outside area in the radial direction of the field coil, and through the magnetic-pole cylindrical portion, the field magnetic flux flows in the axis direction. The field magnetic flux is transferred between the stator core and the magnetic-pole cylindrical portion.

The prior document, the Japanese patent laid open publication No. JP 2002-247817, has proposed to form all of the boss portion, the disk portions, and the magnetic-pole cylindrical portion in the Lundell type rotor core by magnetic steel sheets that are laminated in axis direction. The prior document, the Japanese patent laid open publication No. JP 2005-27415, has proposed to form all of the boss portion, the disk portions, and the magnetic-pole cylindrical portion of the Lundell type rotor core by a soft magnetic core of an ingot shape.

In more detailed explanation, the prior document, the Japanese patent laid open publication No. JP 2005-27415, has adopted the mechanism in which the magnetic-pole cylindrical portion made of such a soft magnetic core of an ingot shape is supported in the axis direction by a first pole core and a second pole core (hereinafter, each pole core will be referred to as "side core"). The first side core has a half boss portion and a disk portion made of soft magnetic core of an ingot shape. Like the first side core, the second side core has a half boss portion and a disk portion made of soft magnetic core of an ingot shape.

However, the magnetic-pole cylindrical portion in the Lundell type rotor core disclosed in the prior document, the Japanese patent laid open publication No. 2002-247817, involves a drawback that increases a space in an electromagnetic circuit in an electric rotary machine, and further increases an reluctance (or a magnetic resistance) and amount of a field current because a penetrate direction of magnetic flux is approximately equal to the direction of the laminated magnetic steel sheets. Further, this prior technique involves a drawback to decrease a stiffness of the rotor core. In more detailed explanation, although the torque of the rotary axis of the rotor is transmitted to the magnetic-pole cylindrical portion through the boss portion and the disk portions, each magnetic steel sheet forming the boss portion and the disk portions made of the magnetic steel sheets in axis direction is shifted towards the circumference direction when the torque is transmitted. Thus, this prior technique has essentially a small torsional stiffness Further, the conventional technique, the Japanese patent laid open publication No. 2005-27415, has a manufacturing limitation of a small allowable-dimension tolerance of each of both the side cores and the magnetic-pole cylindrical portion and a difficulty to satisfy a necessary manufacturing accuracy because its Lundell type rotor core is made of soft magnetic core of an ingot shape. This drawback increases the manufacturing cost of the Lundell type rotor core.

Still further, more specifically, the end surfaces of both the half boss portions are faced to each other in the axis direction of the rotor core, and the magnetic-pole cylindrical portion are accommodated in the space between the half boss portions of the side cores. A small gap is formed between the half boss portions of the side cores or between the magnetic-pole cylindrical portion and the disk portions unless the necessary dimension tolerance in the axis direction is satisfied. Such a presence of the gap decreases the stiffness of the rotor core and also increases the necessary amount of a field current because of increasing the reluctance (or the magnetic resistance). It is therefore important matter to eliminate the gap formed between the half boss portions of the side cores faced to each other.

SUMMARY OF THE INVENTION

It is an object of the present invention to provide a rotor of a rotary electric machine with a mechanism of a Lundell type rotor core having a magnetic-pole cylindrical portion (having a hollow cylindrical shape) without generating any gap in the axis direction formed between the magnetic-pole cylindrical portion and disk portions or formed between the half boss portions with easy manufacturing steps.

To achieve the above purposes, the present invention provides a rotor of a rotary electric machine has a boss portion, a pair of disk portions, and a magnetic-pole cylindrical portion. A field coil is wound on the boss portion and a field magnet flux flows in an axis direction of the boss portion. A pair of the disk portions is extended toward the outside of the boss portion in a radial direction from both ends of the boss portion in the axis direction. Through a pair of the disk portions, the field magnetic flux flows toward the outside of the disk portions in the radial direction. The magnetic-pole cylindrical portion is placed between a pair of the disk portions and has an easy deformation characteristic rather than that of the boss portion and the disk portions. The magnetic-pole cylindrical portion has even number magnet pole parts and boundary parts having connection parts. The even number magnet pole parts are formed at a desired pitch in the circumference direction of the magnetic-pole cylindrical portion and magnetically mated with a pair of the disk portions alternately in the circumference direction. The connection parts are mechanically connecting the adjacent magnet pole parts together in the circumference direction.

According to the present invention, the stiffness of the magnetic-pole cylindrical portion of the Lundell type rotor core in the axis direction is reduced, and the weak stiffness absorbs a dimension tolerance of each components, a pair of the disk portions and the magnetic-pole cylindrical portion, when the magnetic-pole cylindrical portion is assembled between the both side cores placed in the axis direction. The dimension of the magnetic-pole cylindrical portion in the axis direction is formed larger than a gap (or the width in the axis direction of an accommodation space for the magnetic-pole cylindrical portion) between a pair of the side cores into which the magnetic-pole cylindrical portion is mated.

It is thereby possible to prevent generation of a gap in the axis direction between the half boss portions or of the space between the magnetic-pole cylindrical portion and the disk portions after assembling of the Lundell type rotor core.

Further, according to the present invention, because of not necessity to reduce the stiffness of the side cores in the axis direction, it is possible to avoid any difficulty to manufacture the side cores (or the half boss portion and the disk portions) and possible to reduce the magnetic flux passing characteristic.

Further, it is possible to form the half boss portions as the side cores and the disk portions in an integral body or to form them separately to each other.

Still further, it is acceptable to form magnet pole parts of the magnetic-pole cylindrical portion and the connection parts with a same material or different materials. When they are formed with a same material, it is preferred to reduce a sectional area of the magnetic path in the connection parts in the circumference direction or also preferred to reduce a magnetic permeability or a saturation field magnetic flux density of each connection part. For example, it is acceptable to form an austenite crystal structure in the soft magnetic sheets by irradiating a laser-beam so as to heat the soft magnetic sheets in order to obtain a non-magnetic characteristic.

According to another aspect of the present invention, the magnetic-pole cylindrical portion is made of soft magnetic sheets laminated in the axis direction of the rotor core. Because each soft magnetic sheet is easily bent in the axis direction, it is possible to absorb the dimension error when the magnetic-pole cylindrical portion is mated between both the disk portions. More specifically, one of both the magnetic pole parts adjacent to each other in the circumference direction is contacted to one of a pair of the disk portions and the other magnetic pole part is contacted to the other disk portion. When the magnetic-pole cylindrical portion is mated between both the disk portions, those two magnetic pole parts in the magnetic-pole cylindrical portion are deformed in opposite directions along the axis direction, and the connection part in the boundary part between the adjacent magnetic pole parts in the magnetic-pole cylindrical portion is bent, and as a result, the width of the connection part in the axis direction is thereby reduced.

Because the soft magnetic sheet has a reduced thickness in the axis direction, it is possible to deform it easily. Furthermore, during the bending process, because there is a small gap between the soft magnetic sheets laminated in the axis direction, it is possible to eliminate such a dimension error of the magnetic steel sheets by using elastic compression of a soft insulation film that covers each soft magnetic sheet.

Because the surface of the magnetic-pole cylindrical portion faced to the stator core has a high frequency component caused by changing the magnetic flux by teethes of the stator core localized in position, it is possible to reduce eddy current loss by adapting the mechanism in which the soft magnetic sheets are laminated in the axis direction. Moreover, it is possible to further reduce the eddy current loss by using magnetic steel sheets as the soft magnetic sheets.

According to another aspect of the present invention, each connection part in the boundary part between adjacent magnetic pole parts in the magnetic-pole cylindrical portion has a penetrate hole in the axis direction. It is thereby possible to easily deform the connection part in the axis direction and further to reduce the amount of leakage of the magnetic flux flowing through the magnetic-pole cylindrical portion in the circumference direction when the magnetic-pole cylindrical portion is mated between both the disk portions. Through the penetrate hole formed in the connection part, it is possible to laminate the soft magnetic sheets easily and correctly in the axis direction, or also possible to insert bolts through the penetrate holes, with which the magnetic-pole cylindrical portion is fixed to the disk portions. It is acceptable to form a concave part which is open toward the inside area in the radial direction instead of the penetrate hole, namely, an opening part formed in the axis direction.

According to another aspect of the present invention, a permanent magnet is accommodated in each penetrate hole or each concave part in order to increase the magnetic flux of the magnetic poles. It is thereby possible to reduce the leakage magnetic flux by magnetically saturating the connection part and to increase the total output of the alternator.

According to another aspect of the present invention, because each magnetic pole part has a partial cylindrical shape and each connection part has a flat shape on the outer surface of the magnet-pole cylindrical portion, it is thereby possible to smoothly change the magnetic flux by gradually changing the outer diameter of the connection part. This smooth change of the magnetic flux can reduce magnetic noise generated according to the change of the magnetic flux.

In addition, because the sectional area of the connection part is reduced in the circumference direction, it is possible to reduce the leakage.

According to another aspect of the present invention, because the connection part has a weak magnetic characteristic when compared with that of the magnetic pole parts, it is thereby possible to reduce the leakage magnetic flux flowing through the connection part in the circumference direction. This increases the output of the alternator.

According to another aspect of the present invention, the connection parts are made of non-magnetic material. It is thereby possible to reduce the leakage magnetic flux drastically. Further, it is acceptable to form the connection parts with non-magnetic thin sheets laminated in the axis direction or to form them with thin sheets laminated in the axis direction. It is further possible to form the connection parts with an ingot-shape material instead of the lamination structure.

According to another aspect of the present invention, each connection part in the magnetic-pole cylindrical portion is pressed between the adjacent magnetic pole parts of soft magnetic characteristic in the axis direction, and the magnetic pole parts and the connection parts are fixed and mated in the circumference direction. It is thereby possible to have different magnetic characteristics of the magnetic pole parts and the connection parts easily, and to form the magnetic pole parts and the connection parts in one body. Because each connection part is applicable shiftable to the adjacent magnetic pole parts in the axis direction, it is easily possible to absorb the dimension tolerance or margin easily.

According to another aspect of the present invention, a part of each disk portion has a partial cylindrical surface whose outer diameter is approximately equal to that of each magnet pole part in the magnet-pole cylindrical portion. This partial cylindrical surface of the disk portion serves as a magnetic pole surface. The magnetic flux is transferred through this magnetic pole surface, the magnet-pole cylindrical portion, and the stator core. It is thereby possible to reduce the dimension of the magnetic-pole cylindrical portion in the axis direction and to increase deformation function of the magnetic-pole cylindrical portion in the axis direction because a part of the magnetic flux flows to the stator core through the disk portion.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the configuration of a rotor core of a rotor in a vehicle alternator which adopts a Lundell type rotor core having a magnetic-pole cylindrical portion mounted on a vehicle alternator according to an embodiment of the present invention.

Figure 1:
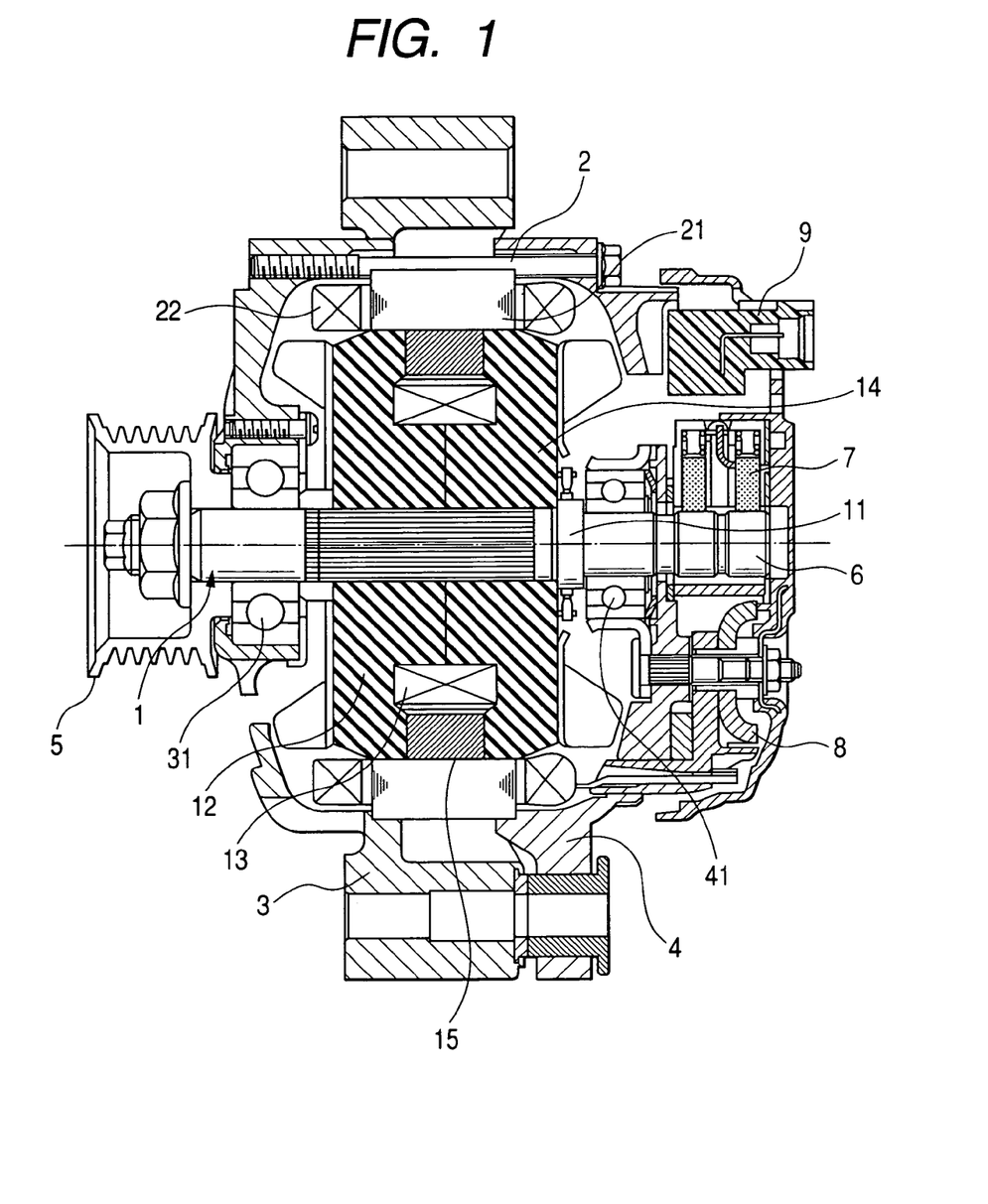
FIG. 1 is a sectional diagram of a vehicle alternator, in an axis direction, with an improved mechanism of a Lundell type rotor core having a magnetic-pole cylindrical portion according to an embodiment of the present invention.

FIG. 1 is a sectional diagram of the vehicle alternator in an axis direction with an improved mechanism of the Lundell type rotor core with the magnetic-pole cylindrical portion according to the embodiment of the present invention.

The vehicle alternator equipped with the Lundel type rotor core and the magnetic-pole cylindrical portion shown in FIG. 1 has a rotor 1, a stator 2, a front frame 3, a rear frame 4, a pulley 5, a slip ring 6, a brush mechanism 7, a rectifier 8, and a regulator 9. The magnetic-pole cylindrical portion has a hollow cylindrical shape (for example, see FIG. 2, FIG. 5).

The stator 2 has a stator coil wound on a stator core 21 and fixed to the inner circumference surfaces of the front frame 3 and the rear frame 4. The front frame 3 and the rear frame 4 accommodate the stator 2 and are fastened to each other by bolts. Further, the front frame 3 and the rear frame 4 rotatably support a rotary shaft 11 of the rotor 1 through both bearings 31 and 41.

Figure 2:
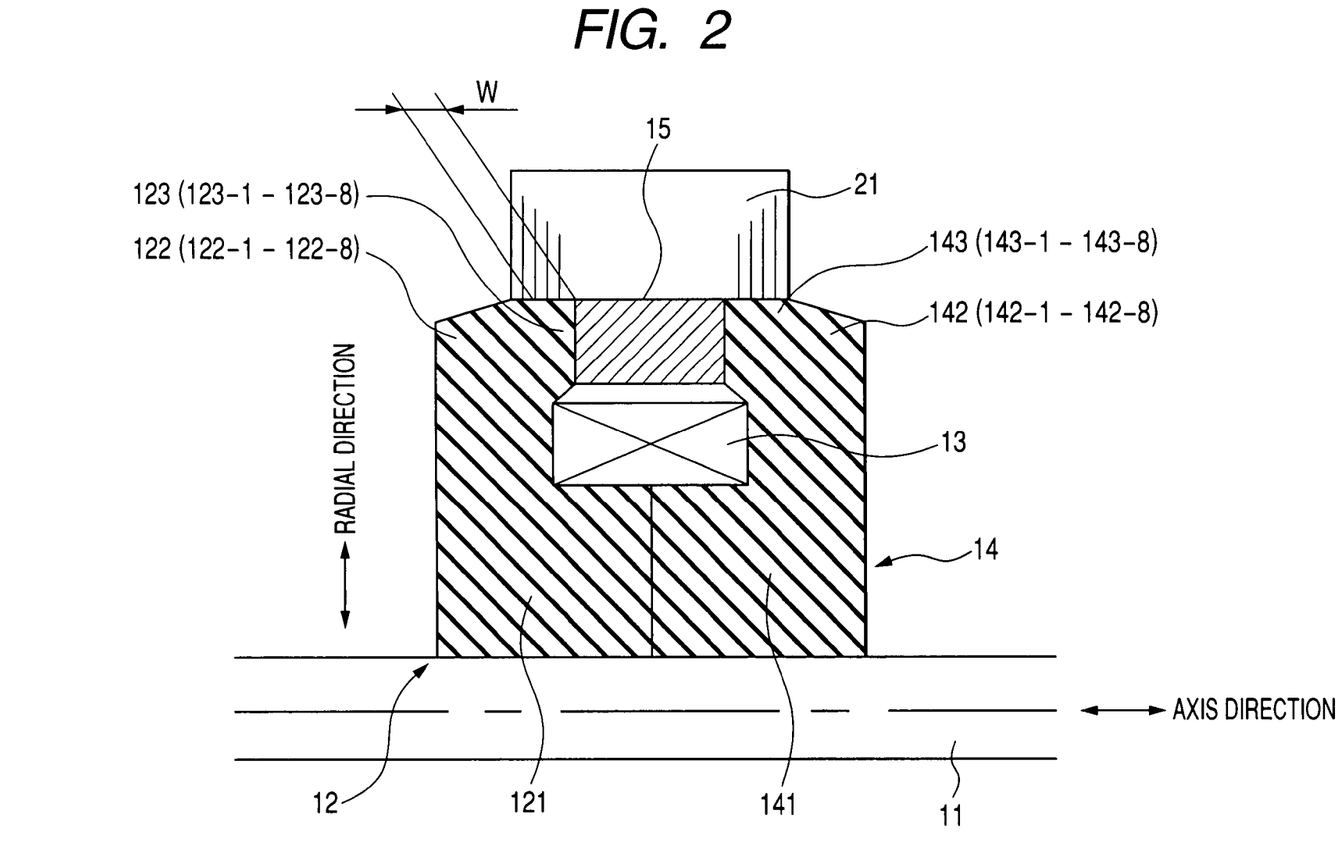
FIG. 2 is a sectional diagram of both the Lundell type rotor core having the magnetic-pole cylindrical portion, in the axis direction, of the vehicle alternator shown in FIG. 1.

FIG. 2 is a sectional diagram showing the Lundell type rotor core of the rotor 1, the magnetic-pole cylindrical portion 15, and the stator core 21 mounted on the vehicle alternator shown in FIG. 1.

As shown in FIG. 2, the rotor core has a pair of a front side core 12 and a rear side core 14 (or also referred to as "the pole core 12 and the pole core 14"), a field coil 13 (hereinafter, referred to as "an exciting coil 13") wound on a boss portion, and the magnetic-pole cylindrical portion 15 of a flange shape.

Both the side cores 12 and 14 have a same configuration of a pole core of a well-known conventional Lundell type rotor core other than a configuration of a claw pole. That is, each of the side cores 12 and 14 of the rotor 1 of the embodiment has claw poles of a short length when compared with the length of the conventional claw poles.

Each of the side cores 12 and 14 and the magnetic-pole cylindrical portion 15 has an approximate flange shape and manufactured by forging process with soft steel or mild steel. The magnetic-pole cylindrical portion 15 is made of magnetic steel sheets laminated in the axis direction of the rotor 1. The entire of the side cores 12 and 14 and the magnetic-pole cylindrical portion 15 will also be referred to as "a rotor core".

The side core 12 has a half boss portion 121 and a disk portion 122 extended from a front end portion of the half boss portion 121 toward the outside of the radial direction of the half boss portion 121. Similar to the side core 121, the side core 14 has a half boss portion 141 and a disk portion 142 extended from a rear end portion of the half boss portion 141 toward the outside of the radial direction of the half boss portion 141.

Figure 3:
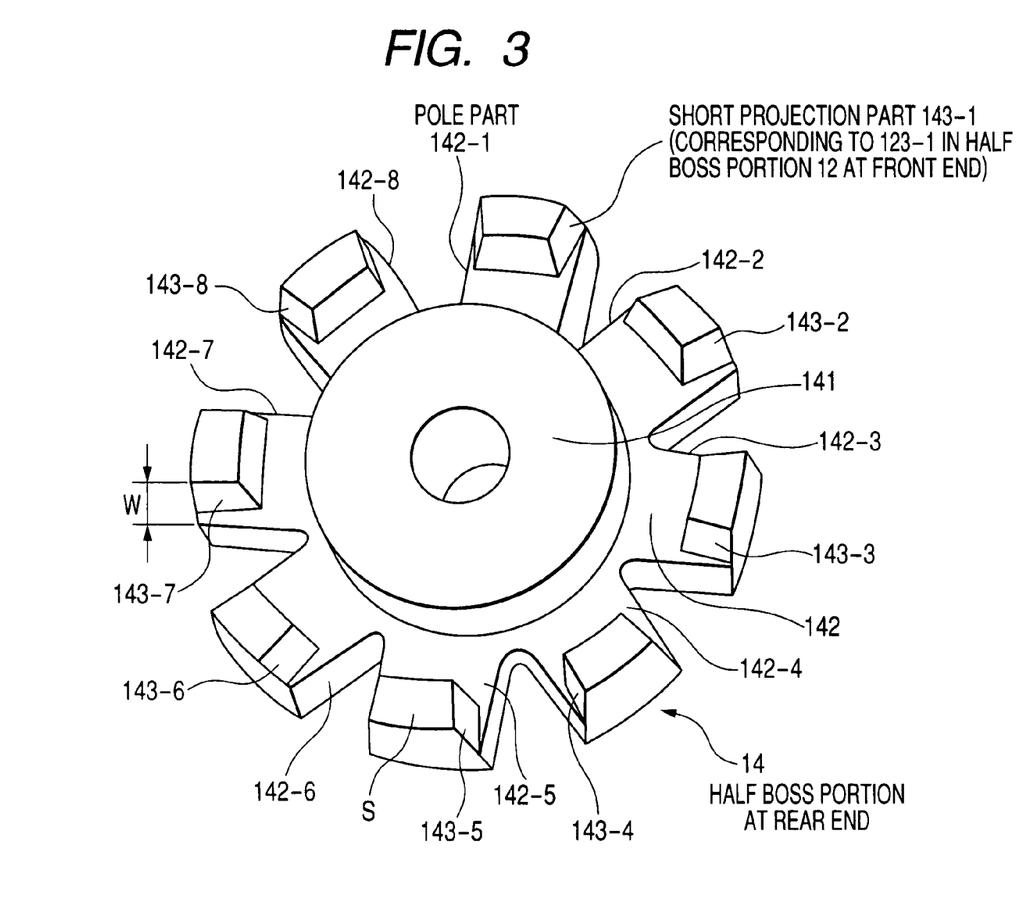
FIG. 3 is an oblique diagram of a side core forming the Lundell type rotor core shown in FIG. 2.

Both the side cores 12 and 14 have the same configuration of that of the conventional rotor core other than the configuration of each of the claw poles. That is, as shown in FIG. 3, each claw pole of both the side cores 12 and 14 in the Laundell type rotor core according to the embodiment has a small dimension. The rear surface of the side core 12 is faced to the front surface of the side core 14 to each other. The exciting coil 13 is accommodated by both the side cores 12 and 14.

It is vague to clearly distinguish the boundary area between the half boss portion 121 in the side core 12 and the disk portion 122, and the boundary area between the half boss portion 141 in the side core 14 and the disk portion 142. In the following explanation, it is defined that the outer circumference surface of each of the half boss portions 121 and 141 contacts to the inner circumference surface of the exciting coil 13. The disk portion 122 and the half boss portion 121 are formed in one body, and as shown in FIG. 3, the disk portion 142 and the half boss portion 141 are formed in one body. Thus, the disk portion 122 is protruded in the radial direction from the end surface of the half boss portion 121 toward the outside of the half boss portion 121 along the end surface of the exciting coil 13. Similarly, as shown in FIG. 3, the disk portion 142 is protruded in the radial direction from the end surface of the half boss portion 141 toward the outside of the half boss portion 141 along the end surface of the exciting coil 13.

Because each of the side cores 12 and 14 has a same configuration, FIG. 3 shows the oblique diagram of only the disk portion 142 in the side core 14.

As clearly shown in FIG. 3, the outer peripheral part of the disk portion 142, which is extended in the radial direction from the half boss portion 141, has total eight projection parts 142-1 to 142-8 formed at a constant pitch in the circumference direction. Hereinafter, the projection parts of the disk portion 142 are referred to as "pole parts 142-1 to 142-8".

Further, short projection parts 143-1 to 143-8 (or short claw poles) are formed on the eight pole parts 142-1 to 142-8, namely, those are formed from the outer end of the pole parts 142-1 to 142-8 toward the rear direction of the axis direction (namely, toward the center of the half boss portion 14). The disk portion 122 in the front half boss portion 12 has the same configuration of the disk portion 142 in the rear half boss portion 14.

Each claw pole 123-1 to 123-8 and 143-1 to 143-8 has a short dimension when compared with each claw pole of the conventional half boss portions. In FIG. 3, reference character "W" designates a height of each of the short projection parts 143-1 to 143-8, and "S" indicates a flat front end surface of each short projection part as a claw pole adjacent to the magnetic-pole cylindrical portion 15.

As shown in FIG. 2, it is noted that the front end portion and the rear end portion of the stator core 21 are projected in the axis direction beyond the front end and the rear end of the exciting coil 13. Each of the short projection part 123-1 to 123-8 and 143-1 and 143-8 in the side cores 12 and 14 is shifted in position to each other by a half pitch along the circumference direction. By applying the electric power to the exciting coil 13, the short projection part 123-1 to 123-8 of the side core 12 and the corresponding short projection part 143-a to 143-8 of the side core 14 are excited in reversed polarity alternately. This phenomenon is the same of that of the conventional Lundell type rotor core.

Hereinafter, a description will now be given of the magnetic-pole cylindrical portion 15 as the feature of the embodiment with reference to FIGS. 4A and 4B.

Figure 4A:
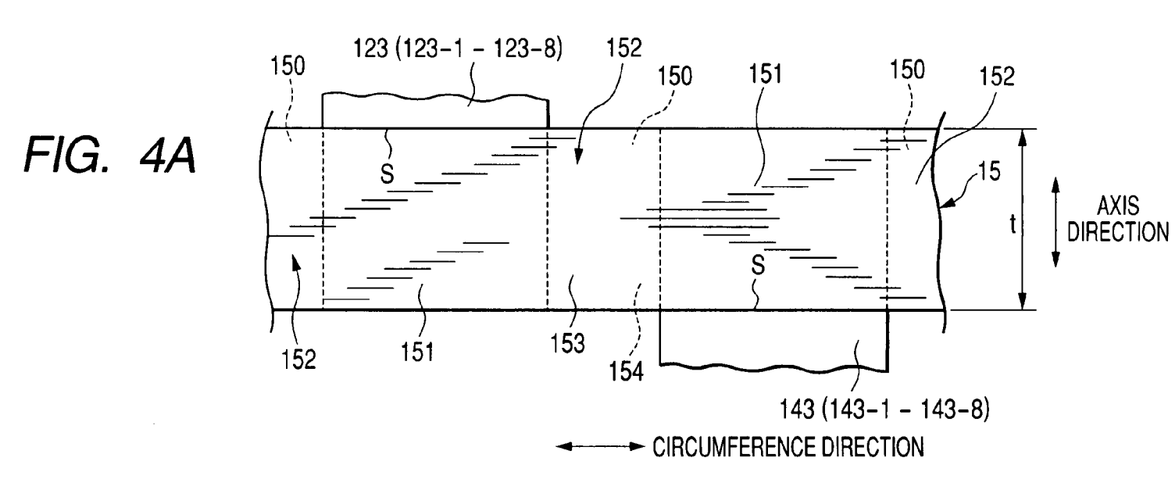
FIG. 4A is a partial development diagram of the magnetic-pole cylindrical portion, in a radial direction, in the Lundell type rotor core of the vehicle alternator as shown in FIG. 1.

FIG. 4A is a partial development diagram of the Lundell type rotor core with the magnetic-pole cylindrical portion 15 shown in FIG. 2 along a radial direction. FIG. 4B is a partial development diagram of the Lundell type rotor core with the magnetic-pole cylindrical portion 15 shown in FIG. 2 along the axis direction.

The magnetic-pole cylindrical portion 15 is made of magnetic steel sheets (or soft steel sheets) laminated in an approximate cylindrical shape in the axis direction.

In each magnetic steel sheet forming the magnetic-pole cylindrical portion 15, penetrate holes 150 of a sectional rectangle shape are formed in the axis direction and the boundary parts between the short projection part 123-1 to 123-8 and the corresponding short projection part 143-1 to 143-8 in the circumference direction.

Figure 4B:
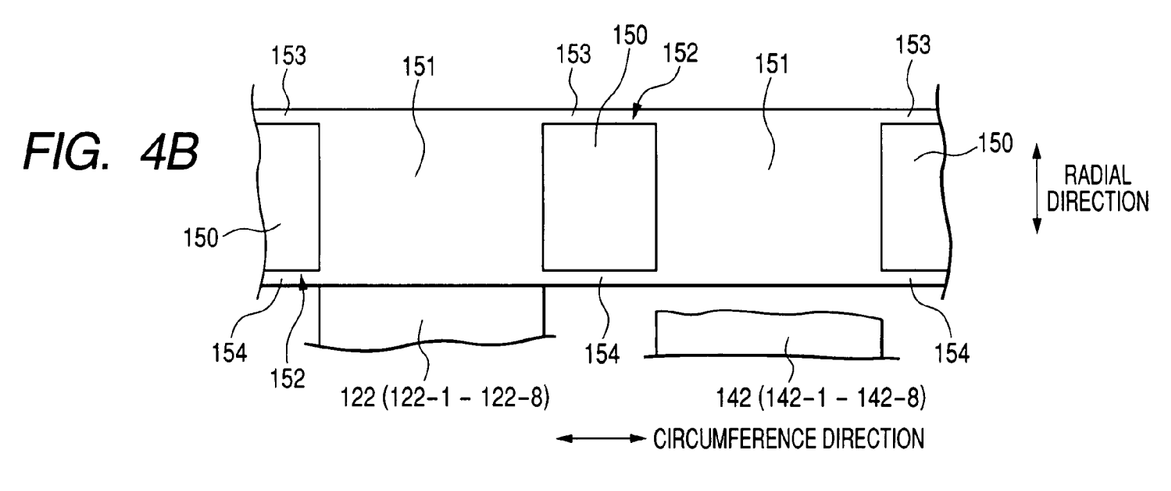
FIG. 4B is a partial development diagram of the magnetic-pole cylindrical portion, in the axis direction, in the Lundell type rotor core of the vehicle alternator as shown in FIG. 1.

In FIGS. 4A and 4B, reference number 152 designates the boundary part between the magnet pole parts 151, in which the penetrate holes 150 are formed. The magnetic flux is transferred between the stator core 21 and the magnetic poles 151 in the magnetic-pole cylindrical portion 15.

As shown in FIG. 4B, the magnetic pole parts 151 are connected together through the connection parts 153 placed at the outside end of the penetrate hole 150 in the circumference direction and the connection parts 154 placed at the inside end thereof.

According to the Lundell type rotor core having the above configuration of the preferred embodiment of the present invention, it is possible to greatly reduce wind noise because of the presence of the magnetic-pole cylindrical portion 15 with the magnet pole parts 151 when compared with the conventional Lundell type rotor core.

Further, according to the preferred embodiment of the present invention, the presence of the penetrate holes 150 formed between the adjacent magnetic pole parts 151 in the circumference direction can reduce leakage magnetic flux which flows between the adjacent magnetic pole parts 151 in the circumference direction drastically.

Furthermore, because the presence or formation of the penetrate holes 150 can reduce bending stiffness of the connection parts 153 and 154, it is possible to form the thickness "t" (see FIG. 4A) of the magnetic-pole cylindrical portion 15 in the axis direction slightly greater than a gap between the front end surfaces "S" (see FIG. 3) of the short projection parts 123 (123-1 to 123-8) and 143 (143-1 to 143-8) during the manufacturing of the rotor core. By this configuration, it is possible to absorb a difference in dimension between the gap of the short projection parts 123 and the thickness "t" of the magnetic-pole cylindrical portion 15 by deforming the connection parts 153 and 154 of the magnetic-pole cylindrical portion 15 under the condition in which the rear end surface of the side core 12 and the front end surface of the side core 14 are faced and contacted to each other when the both side cores 12 and 14 accommodate the exciting coil 13 and the magnetic-pole cylindrical portion 15 therein and are fastened tightly by the bolts in the axis direction of the rotor core. This means that it is possible to greatly release the manufacturing tolerance of each component in the rotor core while preventing any generation of gap in magnetic paths in the rotor core.

That is, the formation of the penetrate holes 150 has two important features, the reduction of leakage magnetic flux and the relaxing of the dimension tolerance. In addition, because the connection parts 153 and 154 connect the outside end and the inside end of the magnetic pole part 151 in the circumference direction, it is possible to prevent unexpected deformation in the magnetic pole part 151 by the force toward the axis direction during the manufacturing process. Further, it is possible to eliminate one of the connection parts 153 and 154, or to form the connection parts 153 and 154 in another portion in the circumference direction of the rotor core.

(First Modification)

A description will now be given of another configuration of the magnetic-pole cylindrical portion in the Lundell type rotor core of the rotor in the vehicle alternator with reference to FIG. 5.

Figure 5:
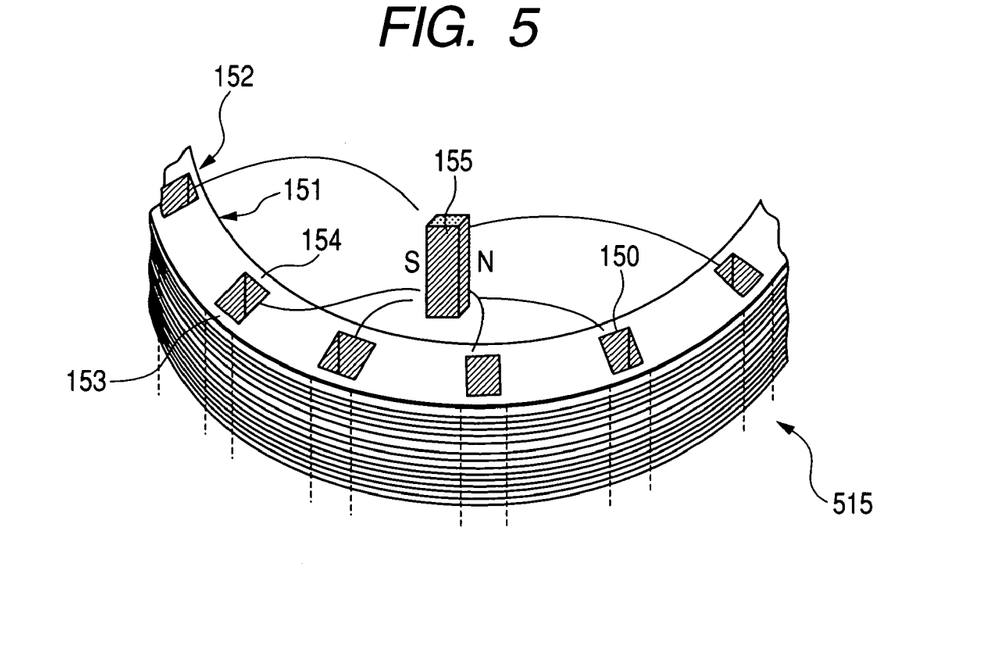
FIG. 5 is an oblique diagram showing another configuration of the magnetic-pole cylindrical portion in the Lundell type rotor core of the vehicle alternator shown in FIG. 1.

FIG. 5 is an oblique diagram showing another configuration of the magnetic-pole cylindrical portion 515. The magnetic-pole cylindrical portion 515 as a modification has the configuration in which a permanent magnet 155 of a square pole shape is inserted into each penetrate hole 150. As well known, the side surface of the permanent magnet 155 in the circumference direction is the magnetic surface in order to increase the magnetic pole. By this configuration using the permanent magnets 155, it is possible to increase the output of the alternator of the Lundell type rotor core without increasing the entire volume thereof.

(Second Modification)

A description will now be given of another configuration of the Lundell type rotor core of the rotor in the vehicle alternator with reference to FIG. 6.

Figure 6:
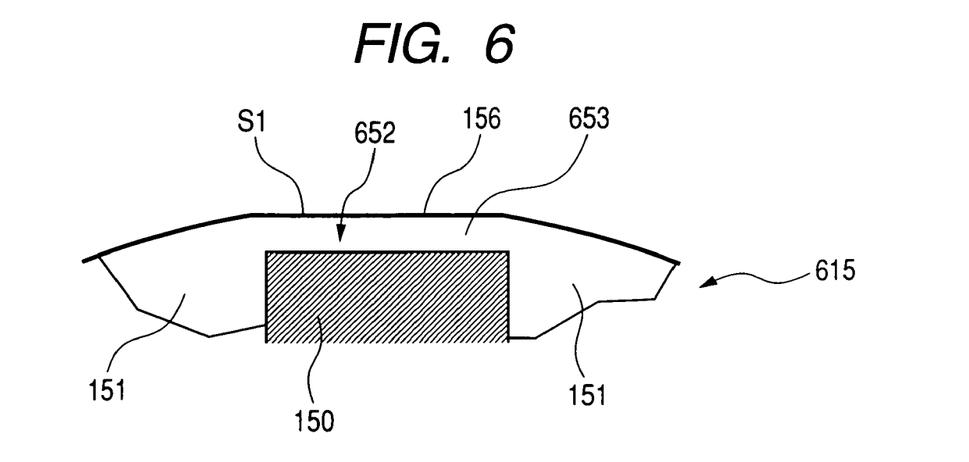
FIG. 6 is an oblique diagram showing another configuration of the magnetic-pole cylindrical portion in the Lundell type rotor core of the vehicle alternator shown in FIG. 1.

FIG. 6 is an oblique diagram showing another configuration of the magnetic-pole cylindrical portion. As shown in FIG. 6, the outer peripheral surface "S1" of each connection part 653 at the boundary part 652 in the magnetic-pole cylindrical portion 615 is formed with a flat shape. This configuration can reduce the amount of leakage magnetic flux because the sectional area of the magnetic path in the connection part 653. In addition, because the magnitude flux in the stator core is smoothly changed through the connection part 653, it is possible to reduce magnetic noise caused by the change of the magnetic flux. In addition, because of the reduction of the bending stiffness of the connection part 653 in the axis direction, it is possible to easily deform the connection part 653 toward the axis direction when the magnetic-pole cylindrical portion 615 is mated into the space formed between a pair of the disk portions 122 and 142.

(Third Modification)

A description will now be given of another configuration of the magnetic-pole cylindrical portion in the Lundell type rotor core of the rotor in the vehicle alternator.

It is possible to reduce the magnetic characteristic of the connection parts 153 and 154 by heating a spot of the connection parts 153 and 154 of the soft magnetic thin sheets (magnetic steel sheets laminated in the axis direction) forming the magnetic-pole cylindrical portion 15, for example by applying a laser beam onto the spot of the connection parts 153 and 154, as shown in FIGS. 4A and 4B.

For example, it is possible to make the connection parts 153 and 154 in the boundary part 152 of a large amount of non-magnetic material of austenite crystal structure. At the same time, it is thereby possible to mechanically connect the magnetic steel sheets to each other. It is also acceptable to laminate the magnetic steel sheets or magnetic soft steel sheets after irradiating a laser beam onto spot areas of the connection parts 153 and 154 of the magnetic-pole cylindrical portion 15 in order to form the connection parts 153 and 154 with non-magnetic characteristic. It is better to use the composite Magnet member described in U.S. Pat. No. 5,821,000.

(Fourth Modification)

A description will now be given of another configuration of the magnetic-pole cylindrical portion in the Lundell type rotor core of the rotor in the vehicle alternator with reference to FIG. 7.

Figure 7:
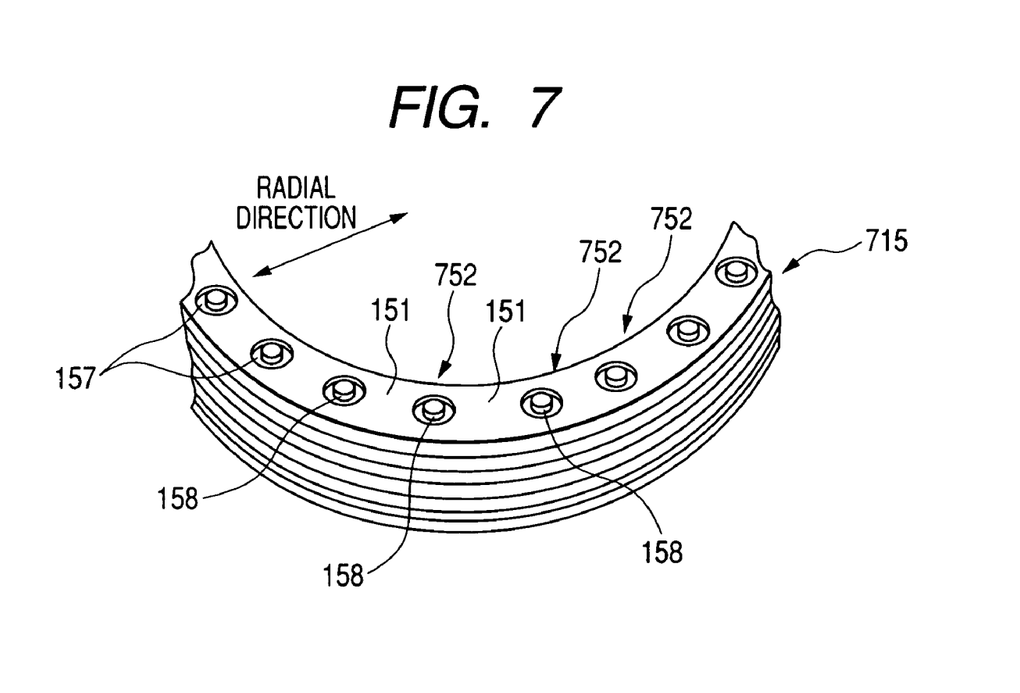
FIG. 7 is an oblique diagram showing another configuration of the magnetic-pole cylindrical portion in the Lundell type rotor core of the vehicle alternator shown in FIG. 1.
Figure 8:
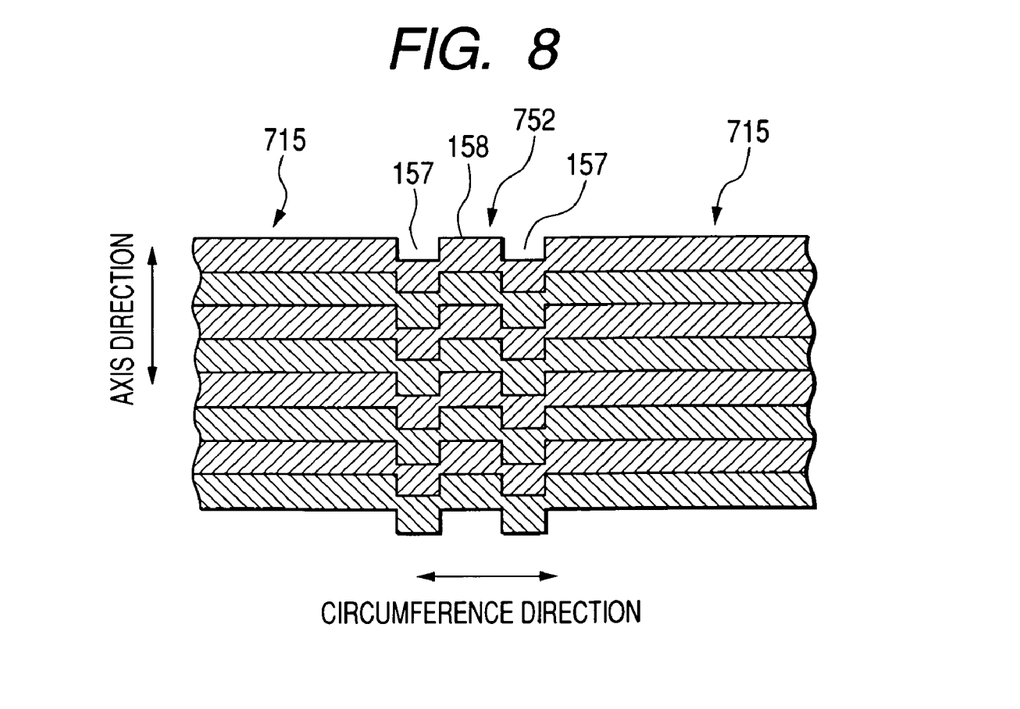
FIG. 8 is a sectional diagram showing the magnetic-pole cylindrical portion, as shown in FIG. 7, in the Lundell type rotor core of the vehicle alternator shown.

FIG. 7 is an oblique diagram showing another configuration of the magnetic-pole cylindrical portion 715. FIG. 8 is a sectional diagram showing the magnetic-pole cylindrical portion 715 shown in FIG. 7.

As shown in FIG. 7 and FIG. 8, in each magnetic steel sheet (or each soft steel thin sheet), the boundary part 752 between the adjacent magnetic poles 151 is easily deformed (during assembling with the side cores 12 and 14), namely, has a concave part 157 of a ring shape and a convex part 158 of a pole shape to be placed in the axis direction of the rotor core. In such a configuration, the concave part 157 surrounds the corresponding convex part 158, as shown in FIG. 7 and FIG. 8. The adjacent magnetic steel sheets are mated or fitted together and laminated correctly in the axis direction of the rotor core through the concave part 157 and the convex part 158 of a pole shape. Further, this configuration of the magnetic-pole cylindrical portion 715 can increase the mechanical connection strength between the magnetic steel sheets laminated in the axis direction and easily deform the boundary parts 752 in the axis direction.

The present invention is not limited by the configuration of the boundary part 752 having the concave part 157 and the convex part 158. For example, it is possible to have another shape of the boundary part other than the shapes of the above concave and convex parts shown in FIG. 7 and FIG. 8.

Further, the deterioration of the magnetic characteristic of the area around the concave part 157 of a ring shape generated by the deformation of the concave part 157 introduces the reduction of leakage magnetic flux between the magnetic poles 151. In addition, it is possible to increase the assembling efficiency of the Lundell type rotor core of the rotor in the vehicle alternator because each magnetic steel sheet is easily deformed in the axis direction by a mating gap between the concave parts 157 of a ring shape in the adjacent magnetic steel sheets to be laminated together.

(Fifth Modification)

A description will now be given of another configuration of the magnetic-pole cylindrical portion in the Lundell type rotor core of the rotor in the vehicle alternator with reference to FIG. 9.

Figure 9:
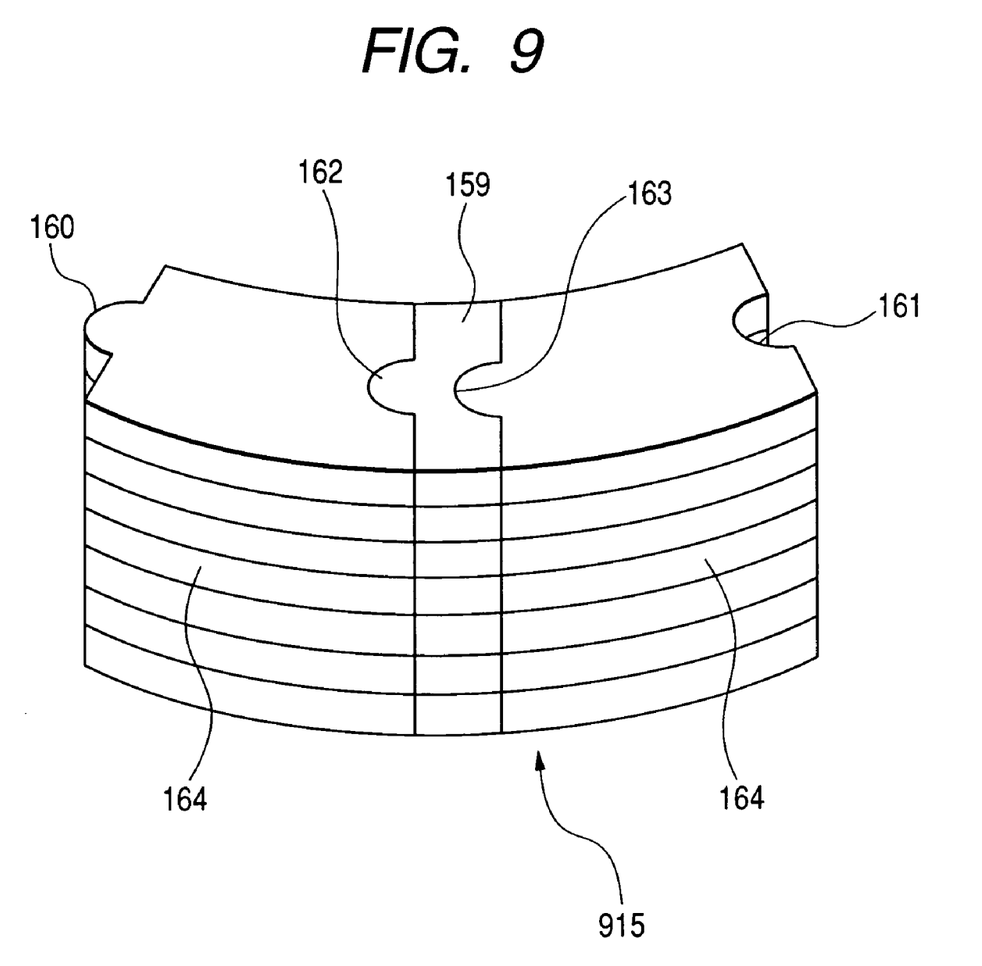
FIG. 9 is a partial oblique diagram showing another configuration of the magnetic-pole cylindrical portion in the Lundell type rotor core of the vehicle alternator shown in FIG. 1.

FIG. 9 is a partial oblique diagram showing another configuration of the magnetic-pole cylindrical portion 915 in the Lundell type rotor core.

As shown in FIG. 9, the magnetic-pole cylindrical portion 915 is made of plural partial ring shape sheets that are laminated in the axis direction. Each partial ring shape sheet is made of magnetic pole sheets 164 made of soft magnetic steel and a connection sheet 159 made of non-magnetic steel sheet placed or mated between the adjacent magnetic pole sheets 164. The plural partial ring shape sheets from the magnetic-pole cylindrical portion 915.

The side end of one magnetic pole sheet 164 has a projection part 160 projected toward approximate circumference direction. The side end of the other magnetic sheet 164 has a concave part 161 formed in approximate circumference direction. Similar to the magnetic pole sheets 164, one end of the connection sheet 159 has a projection part 162 and the other end thereof has a concave part 163 in approximate circumference direction. The magnetic-pole cylindrical portion 915 is formed by mating the magnetic pole sheets 164 and the connection sheet 159 to each other by shifting them in the axis direction. This configuration enables a large deformation of the magnetic-pole cylindrical portion 915 in the axis direction during assembling the Lundell type rotor core. In addition, because the magnetic-pole cylindrical portion 915 has the connection sheets 159 that are made of non-magnetic material such as non-magnetic steel sheets, it is possible to drastically reduce the amount of leakage magnetic flux.

(Sixth Modification)

A description will now be given of another configuration of the Lundell type rotor core of the rotor in the vehicle alternator with reference to FIG. 10 and FIG. 11.

Figure 10:
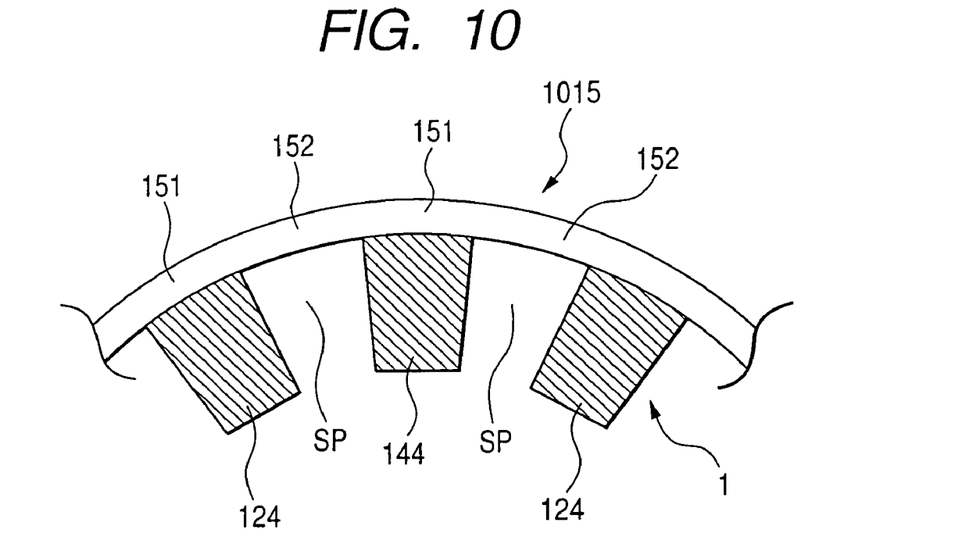
FIG. 10 is a sectional diagram showing another configuration of both the Lundell type rotor core having the magnetic-pole cylindrical portion, in the radial direction, of the vehicle alternator shown in FIG. 1.
Figure 11:
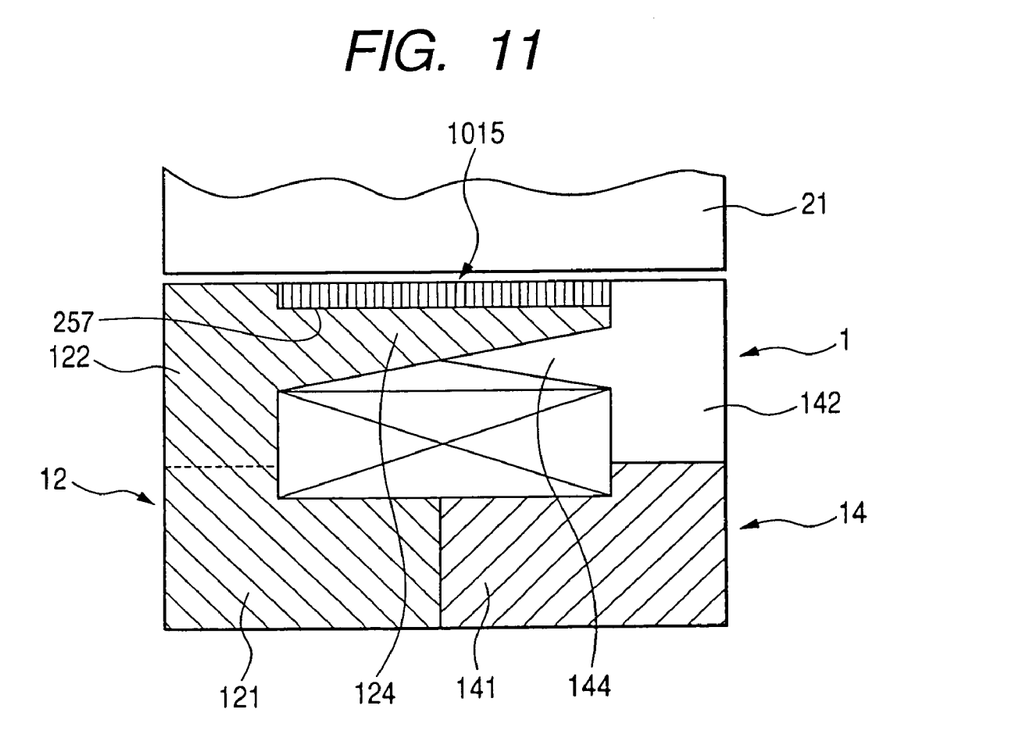
FIG. 11 is a sectional diagram showing the configuration of both the Lundell type rotor core having the magnetic-pole cylindrical portion in the axis direction shown in FIG. 10.

FIG. 10 is a sectional diagram, in the radial direction, showing another configuration of the Lundell type rotor core having the magnetic-pole cylindrical portion 1015. FIG. 11 is a sectional diagram, in the axis direction, showing the Lundell type rotor core having the magnetic-pole cylindrical portion 1015 shown in FIG. 10.

As shown in FIG. 10, the Lundell type rotor core according to the modification has plural claw poles 124 and 144, and the length of each of the claw poles 124 and 144 is longer than that of each of the claw poles 123 and 143 shown in FIG. 2, FIG. 3, FIG. 4A, and FIG. 4B, but is the same as the length of each claw pole in the conventional rotor core.

The Lundell type rotor core according to the modification has the magnetic-pole cylindrical portion 1015 and the width of which in the axis direction of the rotor core is shorter than that of the magnetic-pole cylindrical portion 15 shown in FIG. 4A and FIG. 4B. The magnetic-pole cylindrical portion 1015 shown in FIG. 10 and FIG. 11 is placed and mated between the claw poles 124 and 144 and in a concave part 257 of each claw pole 124 and 144 on the outer peripheral portion of the claw poles 124 and 144. The magnetic-pole cylindrical portion 1015 is made of magnetic steel sheets laminated.

That is, the side core 12 as the pole core has the half boss portion 121, the disk portion 122 extended from a front end portion of the half boss portion 121 toward the outside of the radial direction of the half boss portion 121, and even number claw poles 124.

Further, the side core 14 has the half boss portion 141, the disk portion 142 extended from a rear end portion of the half boss portion 141 toward the outside of the radial direction of the half boss portion 141, and even number claw poles 124.

The magnetic-pole cylindrical portion 1015 is mated between the claw poles 124 and 144. In each magnetic steel sheet forming the magnetic-pole cylindrical portion 1015, the boundary part 152 (consisting of the connection parts) is non-magnetized or the width of the boundary part 152 is reduced in order to be magnetic saturation. It is acceptable to insert and place the permanent magnet in the gap "SP" formed or surrounded by the connection parts in the boundary part 152 and both the claw poles 124 and 144. At this configuration, the magnetic-pole cylindrical portion 1015 also serves as a supporting member for mechanically supporting the permanent magnet.

According to the configuration of the rotor core in the rotor of a vehicle alternator of the sixth modification described above, it is possible to reduce wind noise and to promote the magnetic flux flow in the claw poles in the axis direction, and further to reduce an eddy current loss in the outer peripheral surface of the claw poles 124 and 144.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A rotor of a rotary electric machine comprising:
a boss portion on which a field coil is wound, a field magnet flux flowing in an axis direction of the boss portion;
a pair of disk portions extended in a radial direction toward an outside of the boss portion from both ends of the boss portion in the axis direction, and through which the field magnetic flux flows toward the outside of the disk portions in the radial direction; and
a magnetic-pole cylindrical portion placed between the pair of disk portions, made of soft magnetic sheets laminated in the axis direction, and having an easy deformation characteristic compared to that of the boss portion and the disk portions, the magnetic-pole cylindrical portion comprising:
even number magnet pole parts formed at a desired pitch in a circumference direction of the magnetic-pole cylindrical portion, and magnetically mating the pair of disk portions alternately in the circumference direction; and
boundary parts having connection parts mechanically connecting adjacent magnet pole parts together in the circumference direction,
wherein a concave part of a ring shape and a convex part of a pole shape surrounded by the concave part are formed in each connection part between adjacent magnetic pole parts in each soft magnetic sheet.

2. The rotor of a rotary electric machine according to claim 1, wherein each of the boundary parts has a penetrate hole penetrating in the axis direction.

3. The rotor of a rotary electric machine according to claim 2, wherein a permanent magnet is accommodated in the penetrate hole in order to increase a strength of a field magnetic flux of the magnetic pole parts.

4. The rotor of a rotary electric machine according to claim 1, wherein an outer peripheral surface of the magnetic-pole cylindrical portion has a partial cylindrical surface at the magnet pole parts and a plane surface at the connection parts in the boundary parts.

5. The rotor of a rotary electric machine according to claim 1, wherein a magnetic characteristic of each connection part is weaker than that of each magnet pole part.

6. The rotor of a rotary electric machine according to claim 5, wherein the connection parts are made of non-magnetic material.

7. The rotor of a rotary electric machine according to claim 6, wherein the connection parts are mated with the magnetic pole parts made of soft magnetic material.

8. The rotor of a rotary electric machine according to claim 5, wherein the connection parts are made of a large amount of austenite crystal structure.

9. The rotor of a rotary electric machine according to claim 1, wherein
- each soft magnetic sheet comprises magnetic pole sheets and connection sheets,
- each magnetic pole sheet has a projection part formed at a front end and a concave part formed in a rear end in the circumference direction of the magnetic-pole cylindrical portion,
- each connection sheet has a projection part formed at a front end and a concave part formed in a rear end in the circumference direction of the magnetic-pole cylindrical portion, and
- each connection sheet is mated between the adjacent magnetic pole sheets through their projection parts and the concave parts.

10. A rotor of a rotary electric machine comprising:
- a boss portion on which a field coil is wound, a field magnet flux flowing in an axis direction of the boss portion;
- a pair of disk portions extended in a radial direction toward an outside of the boss portion from both ends of the boss portion in the axis direction, and through which the field magnetic flux flows toward the outside of the disk portions in the radial direction; and
- a magnetic-pole cylindrical portion placed between the pair of disk portions and having an easy deformation characteristic compared to that of the boss portion and the disk portions, the magnetic-pole cylindrical portion comprising:
  - even number magnet pole parts formed at a desired pitch in a circumference direction of the magnetic-pole cylindrical portion, and magnetically mating the pair of disk portions alternately in the circumference direction; and
  - boundary parts having connection parts mechanically connecting the adjacent magnet pole parts together in the circumference direction, wherein
- the magnetic-pole cylindrical portion is made of soft magnetic sheets laminated in the axis direction,
- claw poles are formed alternately on the peripheral surface of the pair of disk portions in the circumference direction,
- a concave part is formed on the top surface of each claw pole in the radial direction, and
- the magnetic-pole cylindrical portion is mated in the concave part of each claw pole in the circumference direction.

11. The rotor of a rotary electric machine according to claim 10, wherein each of the boundary parts has a penetrate hole penetrating in the axis direction.

12. The rotor of a rotary electric machine according to claim 11, wherein a permanent magnet is accommodated in the penetrate hole in order to increase a strength of a field magnetic flux of the magnetic pole parts.

13. The rotor of a rotary electric machine according to claim 10, wherein an outer peripheral surface of the magnetic-pole cylindrical portion has a partial cylindrical surface at the magnet pole parts and a plane surface at the connection parts in the boundary parts.

14. The rotor of a rotary electric machine according to claim 10, wherein a magnetic characteristic of each connection part is weaker than that of each magnet pole part.

15. The rotor of a rotary electric machine according to claim 14, wherein the connection parts are made of non-magnetic material.

16. The rotor of a rotary electric machine according to claim 15, wherein the connection parts are mated with the magnetic pole parts made of soft magnetic material.

17. The rotor of a rotary electric machine according to claim 14, wherein the connection parts are made of a large amount of austenite crystal structure.

18. The rotor of a rotary electric machine according to claim 10, wherein
- each soft magnetic sheet comprises magnetic pole sheets and connection sheets,
- each magnetic pole sheet has a projection part formed at a front end and a concave part formed in a rear end in the circumference direction of the magnetic-pole cylindrical portion,
- each connection sheet has a projection part formed at a front end and a concave part formed in a rear end in the circumference direction of the magnetic-pole cylindrical portion, and
- each connection sheet is mated between the adjacent magnetic pole sheets through their projection parts and the concave parts.

* * * * *